United States Patent [19]

Lubas

[11] Patent Number: 5,486,550
[45] Date of Patent: Jan. 23, 1996

[54] WATER BASED PIGMENTED INK

[75] Inventor: Manfred Lubas, Nürnberg, Germany

[73] Assignee: J.S. Staedtler GmbH & Co., Nurnberg, Germany

[21] Appl. No.: 261,638

[22] Filed: Jun. 17, 1994

[30] Foreign Application Priority Data

Jun. 24, 1993 [DE] Germany .......................... 43 20 959.9

[51] Int. Cl.⁶ .................................................. C09D 11/10
[52] U.S. Cl. ........................... 523/161; 523/160; 524/27; 524/58; 106/20 R; 106/21 C
[58] Field of Search ..................................... 523/161, 160; 106/20 R, 21 C; 524/27, 58

[56] References Cited

FOREIGN PATENT DOCUMENTS

0344379A2  12/1989  European Pat. Off. .
0374668A2  6/1990   European Pat. Off. .
0540757A1  5/1993   European Pat. Off. .
4020900C1  8/1991   Germany .
61-268773  11/1986  Japan .

*Primary Examiner*—Paul R. Michl
*Assistant Examiner*—John J. Guarriello
*Attorney, Agent, or Firm*—Friedrich Kueffner

[57] ABSTRACT

A water based pigmented ink for writing, drawing, painting, printing or marking, is composed of coloring matter, additives, and water as solvent. The coloring matter is a pigment formed of one or more alkaline dyes and of a solid polymer dispersion component. The ink contains an acid group-free polyhydroxy compound as a stabilizer, and at least one surfactant and/or emulsifier, as well as a preservative.

15 Claims, No Drawings

WATER BASED PIGMENTED INK

BACKGROUND OF THE INVENTION

1. Field of the Invention

The present invention relates to a water based pigmented ink for writing, drawing, painting, printing, or marking. The ink is composed of coloring matter, additives, and water as solvent.

2. Description of the Related Art

Inks of this type are known in the art, particularly in the form of water-based marking fluids.

JP 61-268 773, and EP 0 344 379 A2 which is substantially equivalent to JP 61-268 773, describe a water-based, pigmented, luminescent ink, composed of a dyed material which is formed by polymerization of a monomeric emulsion of acrylonitrile, methacrylic acid and styrene. Thus, a polymeric dispersion is obtained with a particle diameter of less than 0.5 μm. This dispersion is dyed with a fluorescent dye. In addition, the ink contains hydrophilic organic solvents, such as ethylene glycol, propylene glycol, glycerin, etc. In the case of this solvent-containing, lightfast ink, which may also be used in micro-encapsulated carbonless copying papers and fax papers, the trace will darken and lose its luminescence after a certain time. This effect happens in some fax papers already within a few minutes. Furthermore, the ink has a relatively short cap-off time of about 45 minutes. Besides, this ink is difficult to wash out of many kinds of fabrics.

European patent application EP 0 374 668 A2 discloses a fluorescent marking fluid which contains at least one coumarinic dye and has an acrylic resin base which is stable at pH 3 to 5.

This fluid does not attack the dyes in other materials, such as, in particular, the triphenylmethane dyes of carbon papers. The lightfastness of these inks is better than in pyronine ink, but still not satisfactory in many cases. Experiments have shown that the trace does not luminesce until after it is dry. The use of organic solvents that have been proposed for the improvement of this ink is to be seen as a further disadvantage.

DE 40 20 900 C1 describes a marking fluid which is based on an aqueous solution of hydroxy-pyrene-trisulfonic acid. Additives used in this writing fluid are saccharose, lactose, maltose as well as their monosaccharides or mixtures of their saccharides. In addition, this writing fluid contains an isothiazolinone derivative as a preservative, a water soluble bonding agent and wetting agents.

A particular disadvantage of this writing fluid is its limited lightfastness, which is common to all pigment-free inks and which, contrary to pigmented inks, is often unsatisfactory.

Further, there are pigmented luminescent inks on the market whose coloring pigments consist of an alkaline dye and of acrylonitrile/butyl acrylate. Additional components in these inks are a preservative, an emulsifier or wetting agent, and water. The disadvantages of this ink are the same as those described above in connection with EP 0 344 379 A2. Here, too, after a certain time there is a darkening and loss of luminescence of the trace on various fax papers, on some papers already after a few minutes. Furthermore, this ink also has a relatively short cap-off time. Likewise, this ink is hard to wash out of many kinds of fabrics.

SUMMARY OF THE INVENTION

Therefore, it is the primary object of the present invention to improve the known types of ink and to provide an ink or marking fluid which is environmentally safe and user friendly, suitable for diverse applications, colorfast and, in particular, free of organic solvents; furthermore, the ink should be well suited for nearly all fax papers and other coated papers and should not dry out within a short time inside the writing or marking instrument; the trace produced by the ink should keep its color and luminescence and should not change significantly even over a longer time period; also, the ink should be washable from nearly all textile fabrics.

In accordance with the present invention, the coloring matter is a color pigment formed of at least one alkaline dye and at least one solid polymer dispersion component. The ink further is composed of at least one acid group-free polyhydroxy compound as stabilizer and additionally at least one surfactant and/or an emulsifier and preservatives.

The various features of novelty which characterize the invention are pointed out with particularity in the claims annexed to and forming a part of the disclosure. For a better understanding of the invention, its operating advantages, specific objects attained by its use, reference should be had to the descriptive matter below in which there are described preferred embodiments and advantageous further developments of the invention.

DETAILED DESCRIPTION OF THE PREFERRED EMBODIMENTS

The mixing of inks in accordance with the present invention is illustrated through the following examples.

Example 1.1: Color yellow
    427.5 g $H_2O$ (W)
      20 g lanolin-sulfosuccinate (T)
       3 g benzisothiazolinon (K)
      50 g pentaglycerin (90% in $H_2O$) (AG)
    100 g saccharose (AZ)
      6.5 g basic yellow 40 (500% color strength) (F)
      0.5 g solvent yellow 43 (F)

To these base components are added 420 g of a polymer dispersion (P) with an average particle size of 0.1 μm, composed of approx. 60–68% water and approx. 32–40% solid matter which is preferably composed of 62–63% acrylonitrile and 38–37% butyl acrylate. The saccharose (AZ) (if necessary, dissolved in water, in a 60–95% concentration) may also be added after a possible heating and cooling of the initial mixture. The color pigment (FP) is formed in this process during the mixing of all components and a possible heating, within the complete mixture.

In analogy to the preceding example, instead of saccharose, the following sugars or sugar alcohols may be used, preferably in the same quantity:

Example 1.2 with 100 g D-glucose (dextrose) (AZ),
        1.3 with 100 g D-fructose (AZ),
        1.4 with 100 g D-galactose (AZ),
        1.5 with 100 g lactose (AZ),
        1.6 with 100 g maltose, or maltotriose (AZ),
        1.7 with 100 g cellobiose (AZ),
        1.8 with 100 g sorbitol (AA),
        1.9 with 100 g xylitol (AA),
      1.10 with 100 g lactite (AA),
      1.11 with 100 g isomalt (AA), or
      1.12 with 100 g mannitol (AA).

Instead of or in addition to combining the other components of example 1.1 with the sugars (AZ) or with sugar alcohols (AA) of examples 1.1 to 1.12, the same other components may be combined:

---
1.13 with 50 g decaglycerin (90% in H₂O) (AG),
1.14 with 59 g decaglycerin (85% in H₂O) (AG), or
1.15 with 45 g pentaglycerin (AG).
---

Pentaglycerin and decaglycerin in 100% concentration are difficult to handle because of their very high viscosity; a 90% or 85% concentration is therefore preferable.

---
Example 2.1: Color red
    475 g H₂O
    50 g pentaglycerin (90%;)
    20 g lanolin-sulfosuccinate
    2 g benzisothiazolinone
    100 g saccharose
    1.2 g basic yellow 40 500%
    2.3 g basic red 1
    0.8 g basic violet 10
    420 g polymer dispersion (40–42%)
---

Otherwise same as examples 1.1 to 1.15.

---
Example 3.1: Color pink
    470 g H₂O
    20 g lanolin-sulfosuccinate
    2 g benzisothiazolinone
    50 g pentaglycerin (90%)
    100 g sorbitol
    2.5 g basic red 1
    1 g basic violet 10
    420 g polymer dispersion (40–42%)
---

Otherwise same as examples 1.1 to 1.15.

---
Example 4.1: Color blue
    470 g H₂O
    20 g lanolin-sulfosuccinate
    2 g benzisothiazolinone
    50 g pentaglycerin (90%)
    100 g sorbitol
    0.6 g basic blue 3
    420 g polymer dispersion (40–42%)
---

Otherwise same as examples 1.1 to 1.15.

---
Example 5.1: Color orange
    470 g H₂O
    20 g lanolin-sulfosuccinate
    2 g benzisothiazolinone
    50 g pentaglycerin (90%)
    100 g sorbitol
    3.5 g basic yellow 40 (500%)
    1.3 g basic red 1
    0.2 g basic violet 10
    420 g polymer dispersion (40–42%)
---

Otherwise same as examples 1.1 to 1.15.

---
Example 6.1: Color green
    470 g H₂O
    20 g lanolin-sulfosuccinate
    2 g benzisothiazolinone
    50 g pentaglycerin (90%)
    100 g sorbitol
    6 g basic yellow 40 (500% color strength)
    0.5 g solvent yellow 43
    420 g polymer dispersion (40-424)
    Otherwise same as examples 1.1 to 1.15.
---

6 g reactive blue 41 is added for toning after the, mixture has been heated.

---
Example 7.1: Color purple
    470 g H₂O
    20 g lanolin-sulfosuccinate
    2 g benzisothiazolinone
    50 g pentaglycerin (90%)
    100 g sorbitol
    5 g basic violet 35
    420 g polymer dispersion (40–42%)
---

Otherwise same as examples 1.1 to 1.15.

As in examples 1.1 to 1.12, combinations with pentaglycerin and/or with decaglycerin are possible in examples 2.1 to 7.1, e.g., in analogy to examples 1.13 to 1.15.

Lactose (solubility 19.2 g in 100 g H₂O at 20° C.), mannitol (solubility 18.6 g in 100 g H₂O at 20° C.) and maltotriose have a relatively low solubility compared to the other sugars, sugar alcohols, and polyglycerins. Therefore, the solution with the dyes, before the dispersion is added, will be slightly turbid. However, after heating and subsequent cooling, all components will be dissolved. With an analogous application as in the examples of the various other combinations, there is no significant difference in the suitability for fax paper. Regarding the "cap-off" behavior, it should be noted that formulations with the less soluble sugars or sugar alcohols may crystallize at the tip. However, the instrument will continue to write even if it has been unused for two hours with the cap off.

Furthermore, formulations are possible which contain only pentaglycerin and/or decaglycerin, or which contain only sugar alcohol or sugar, in accordance with the following recipes:

---
Example 8.1: Color yellow
    470 g H₂O
    20 g lanolin-sulfosuccinate
    2 g benzisothiazolinone
    100–150 g pentaglycerin
    6.5 g basic yellow 40 (500%)
    0.5 g solvent yellow 43
    420 g polymer dispersion (40–42%)
---

Continue as in example 1.1.

---
Example 8.2: Color yellow
    470 g H₂O
    20 g lanolin-sulfosuccinate
    2 g benzisothiazolinone
    100–150 g decaglycerin (90%)
    6.5 g basic yellow 40 (500%)
    0.5 g solvent yellow 43
    420 g polymer dispersion (40–42%)
---

Continue as in example 1.1.

---
Example 8.3: Color yellow
    470 g H₂O
    20 g lanolin-sulfosuccinate
    2 g benzisothiazolinone
    100–150 g sugar (lactose)
    6.5 g basic yellow 40 (500%)
    0.5 g solvent yellow 43
    420 g polymer dispersion (40–42%)
---

Continue as in example 1.1.

| | |
|---|---|
| Example 8.4: | Color yellow |
| 470 g | H₂O |
| 20 g | lanolin-sulfosuccinate |
| 2 g | benzisothiazolinone |
| 100–150 g | sugar alcohol (mannitol) |
| 6.5 g | basic yellow 40 (500%) |
| 0.6 g | solvent yellow 43 |
| 420 g | polymer dispersion (40–42%) |

Continue as in example 1.1.

The solvents (LM) that were previously used as anti-drying and anti-freezing agents, such as ethylene glycol, diethylene glycol, propylene glycol, and glycerin, are replaced with water and at least one polyhydroxy compound that contains no acid group. Compounds of this kind include sugars, sugar alcohols and polyglycerins which have many free OH groups. In addition, if necessary, specially selected surfactants, emulsifiers and preservatives are used in combination with predominantly alkaline dyes which react with the particles of a polymer dispersion which has a solid content of 62 to 63% acrylonitrile and 38 to 37% butyl acrylate. Thus, after mixing and, if necessary, heating, inks having the desired properties, pigmented fluorescent inks in particular, are obtained.

Sugars and sugar alcohols proposed in accordance with the invention are water soluble carbohydrates of the general form $C_n(H_2O)_m$ and their reduced versions as sugar alcohols (AA).

The additionally proposed polyglycerins (AG) are preferably glycerin-derived polyethers which are obtained by splitting off the hydrate, wherein pentaglycerin 5 and decaglycerin 10 have glycerin molecules which are connected through ether bridges.

The water-based ink for writing, drawing, painting, printing or marking in accordance with the invention is essentially composed of coloring matter (FM), additives (ZS) and water as solvent (LM).

According to a first feature of the invention, the coloring matter is to be composed of color pigments (FP) that were formed from one or more alkaline dyes (F) and at least one solid polymer dispersion component (P). In accordance with another feature, at least one acid group-free polyhydroxy compound (A) is to be included as a stabilizer. In addition, the ink is to contain at least one surfactant (T) and/or an emulsifier (E) and at least one preservative (K).

It is advantageous of the color pigment (FP) is the reaction product of a polymer dispersion component (P) composed of 60–65% (by weight) acrylonitrile and 35–40% (by weight) butyl acrylate, and at least one alkaline dye (F) and if the color pigments (FP) are formed from the alkaline dye or dyes (F) and the solid dispersion component (P) only within the ink mixture through a reaction between the functional groups.

Alkaline dyes (F) of the group of dyes Basic Yellow 40, Solvent Yellow 43, Basic Red 1, Basic Red 1:1, Basic Violet 10, Basic Blue 3, Reactive Blue 41, Solvent Yellow 160/1, Basic Violet 11:1 and Basic Violet 35, or a mixture thereof, have been found to be well suited.

According to the invention, the acid group-free polyhydroxy compound (A) is specifically a sugar (AG), a sugar alcohol (AA), a polyglycerin (AG) or a mixture thereof. Preferably, the sugar (AZ) is selected from the group of monosaccharides or oligosaccharides and is, specifically, a disaccharide or a trisaccharide, preferably saccharose, glucose, fructose, lactose, or maltose; the sugar alcohol (AA), preferably, is a sorbitol, xylitol, lactite and/or isomalt and/or the polyglycerin (AG) specifically is a pentaglycerin with five glycerin molecules or a decaglycerin with ten glycerin molecules.

Preferred as a preservative (K) are a sodium salt of sorbic acid, a synergistic preparation of benzisothiazolinon, a synergistic mixture of an organic peroxide with alcohols, or a synergistic mixture of semi-acetals and isothiazolinone. The surfactant (T) and/or the emulsifier (E) can be a lanolin sulfosuccinate, an ethoxylated lanolin or lanolin oil, a polyethylene-glycerin-monoisostearate, a polyoxyethylene-glycerin-monooleate, an ethylene-oxide adduct of hydrated castor oil or a polyoxyethylene-glycerin-trioleate.

Preferably, the finished ink is composed of, in weight percentages, 10–25% color pigments (FP), 5–30% polyhydroxy compounds (A), 0.5–3% emulsifiers (E), surfactants (T), preservatives (K), other additives (Z) if necessary, and 60–75% water (W) as a base medium. Especially well suited is a ratio of 15–18% color pigment(s) (FP) with a portion of dye (F) in a quantity of 0.1–1% in weight percentages of the complete mixture and 8–18% in weight percentages of the complete mixture of the acid-free polyhydroxy compound (A) as well as 1.5–2.5% by weight emulsifiers (E), surfactants (T), preservatives (K) and, if necessary, other additives (Z).

The invention is not limited by the embodiments described above which are presented as examples only but can be modified in various ways within the scope of protection defined by the appended patent claims.

I claim:

1. An ink for writing, drawing, painting, printing or marking, the ink comprising a mixture of coloring matter comprising color pigments formed of at least one dye and at least one solid polymer dispersion component, wherein the at least one dye is selected from the group consisting of Basic Yellow 40, Solvent Yellow 43, Basic Red 1, Basic Red 1:1, Basic Violet 10, Basic Blue 3, Reactive Blue 41, Solvent Yellow 160/1, Basic Violet 11:1, Basic Violet 35, or from a mixture thereof, and wherein the at least one solid polymer dispersion component comprises 60–65% acrylonitrile and 35–40% by weight of butyl acrylate, further comprising a stabilizing acid group-free polyhydroxy compound selected from the group consisting of a sugar, a sugar alcohol, a polyglycerin or a mixture thereof, at least one of a surfactant and an emulsifier, at least one preservative, and water as solvent, wherein the color pigments are reaction products formed within the ink mixture through a reaction between functional groups of the at least one alkaline dye and the at least one solid polymer dispersion component.

2. The ink according to claim 1, wherein the at least one dye is an alkaline dye.

3. The ink according to claim 1, wherein the sugar is a monosaccharide or an oligosaccharide.

4. The ink according to claim 1, wherein the sugar is a disaccharide or trisaccharide.

5. The ink according to claim 1, wherein the sugar is saccharose, glucose, fructose, lactose or maltose.

6. The ink according to claim 1, wherein the sugar alcohol is at least one of sorbitol, xylitol, lactite and isomalt.

7. The ink according to claim 1, wherein the polyglycerin is a pentaglycerin having 5 glycerin molecules connected through ether bridges.

8. The ink according to claim 1, wherein the polyglycerin is a decaglycerin with 10 glycerin molecules.

9. The ink according to claim 1, wherein the preservative is selected from the group consisting of a sodium salt of sorbic acid, a synergistic preparation of benzisothiazolinon, a synergistic mixture of an organic peroxide and alcohols, and a synergistic mixture of semi-acetals and isothiazolinones.

10. The ink according to claim 1, wherein the surfactant or emulsifier is selected from the group consisting of lanolin-sulfosuccinate, ethoxylated lanolin, ethoxylated lanolin oil, polyethylene-glycerin-monoisostearate, polyethylene-glycerin-monolaureate, polyoxyethlene-glycerin-monooleate, ethylene oxide adduct of hydrated castor oil, and polyoxyethylene-glycerin-trioleate.

11. The ink according to claim 1, comprising, in percent by weight,

| | |
|---|---|
| 10–25% | color pigment or pigments |
| 5–30% | polyhydroxy compound or compounds |
| 0.5–30% | emulsifiers, surfactants, |
| | preservatives, additives, and |
| 60–75% | water as a base. |

12. The ink according to claim 1, comprising 15–18% by weight color pigment.

13. The ink according to claim 1, comprising the dye in a quantity of 0.1 to 1% by weight of the mixture.

14. The ink according to claim 1, comprising the acid group-free polyhydroxy compound in a quantity of 8–18% by weight of the mixture.

15. The ink according to claim 1, comprising between 1.5 and 2.5% by weight emulsifiers, surfactants, preservatives and additives.

* * * * *